United States Patent
Liu et al.

(10) Patent No.: US 10,760,649 B2
(45) Date of Patent: Sep. 1, 2020

(54) SPEED REDUCER

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Eddy Liu, New Taipei (TW); Wei-Da Yang, New Taipei (TW); Po-Lin Su, New Taipei (TW); Jie-Peng Kang, Zhengzhou (CN); Liu-Ming Zhang, Zhengzhou (CN); Su-Min Li, Zhengzhou (CN); Guang-Xing Wang, Zhengzhou (CN); Jie Lai, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 128 days.

(21) Appl. No.: 16/038,992

(22) Filed: Jul. 18, 2018

(65) Prior Publication Data
US 2019/0346021 A1    Nov. 14, 2019

(30) Foreign Application Priority Data
May 10, 2018    (CN) .......................... 2018 1 0442877

(51) Int. Cl.
F16H 1/32 (2006.01)
F16H 1/22 (2006.01)

(52) U.S. Cl.
CPC .............. *F16H 1/32* (2013.01); *F16H 1/227* (2013.01); *F16H 2001/323* (2013.01); *F16H 2001/327* (2013.01)

(58) Field of Classification Search
CPC . F16H 1/32; F16H 2001/323; F16H 2001/327
See application file for complete search history.

(56) References Cited

U.S. PATENT DOCUMENTS

| | | | | |
|---|---|---|---|---|
| 8,545,357 | B2 * | 10/2013 | Hibino | F16H 1/32 475/162 |
| 10,281,007 | B2 * | 5/2019 | Sugishita | F16H 1/32 |

* cited by examiner

*Primary Examiner* — Erin D Bishop
(74) *Attorney, Agent, or Firm* — ScienBiziP, P.C.

(57) ABSTRACT

A speed reducer includes an input shaft, an output shaft, and a gear assembly coupled to the input shaft. The gear assembly includes a housing, an external gear, and at least two internal gears. The external gear is located within the housing and inscribes the at least two internal gears. One side of the at least two internal gears is rotatably coupled to the input shaft, and another side of the at least two internal gears is coupled to a connecting column of the output shaft. The at least two internal gears are offset on the input shaft, and the input shaft drives the at least two internal gears to maintain engagement with the external gear. The connecting column maintains transmission of the output shaft and the at least two internal gears.

10 Claims, 6 Drawing Sheets

SPEED REDUCER

FIELD

The subject matter herein generally relates to a speed reducer.

BACKGROUND

Generally, precision tools, automatic equipment, and robotic component require a speed reducer to change speeds and transmit torque.

BRIEF DESCRIPTION OF THE DRAWINGS

Implementations of the present disclosure will now be described, by way of example only, with reference to the attached figures.

DETAILED DESCRIPTION

Figure 1:
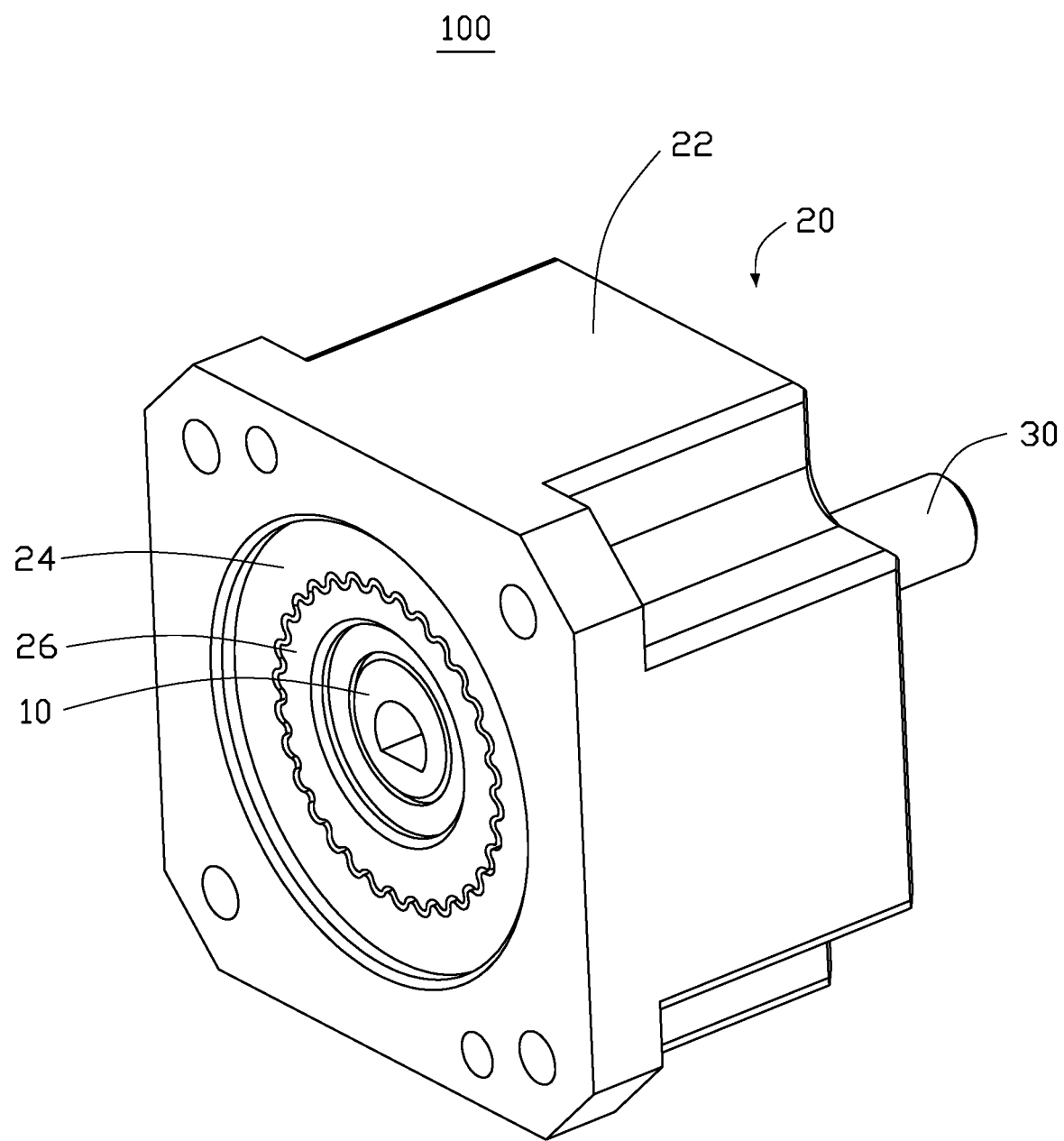
FIG. 1 is an assembled, isometric view of an embodiment of a speed reducer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
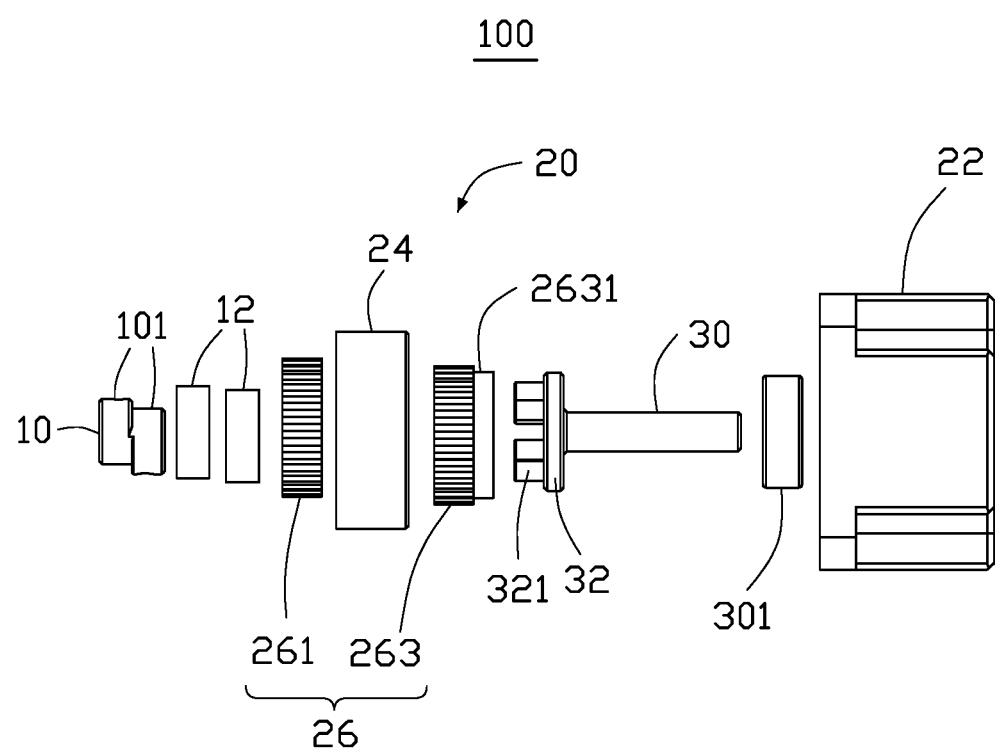
FIG. 2 is an exploded, cross-sectional view of the speed reducer of FIG. 1.

FIG. 1 illustrates an embodiment of a speed reducer 100. The speed reducer 100 includes an input shaft 10, a gear assembly 20, and an output shaft 30. The input shaft 10 and the output shaft 30 are located at opposite sides of the gear assembly 20 and reduce the volume and size cooperatively of the speed reducer 100. Referring to FIG. 2, the input shaft 10 is an offset shaft. The input shaft 10 is coupled to the gear assembly 20. The gear assembly 20 includes a housing 22, an external gear 24, and at least two internal gears 26. The external gear 24 is received within the housing 22. The external gear 24 inscribes the internal gears 26. One side of the internal gears 26 is rotatably coupled to the input shaft 10, and another side of the internal gears 26 is coupled to a connecting column 32 of the output shaft 30. The input shaft 10 drives the internal gears 26 to maintain engagement with the external gear 24, and the connecting column 32 maintains transmission of the output shaft 30 and the internal gear 26. The input shaft 10 includes at least two offset pieces 101 arranged on the input shaft 10. The at least two offset pieces 101 are rotatably coupled to the internal gears 26 through a sleeve 12 (shown in FIG. 3) to cause the internal gears 26 to engage with the external gear 24. In at least one embodiment, the input shaft 10 includes two offset pieces 101. The offset pieces 101 are offset relative to each other on the input shaft 10. In other words, the offset pieces 101 are positioned 180 degrees apart from each other on the input shaft 10 to cause the internal gears 26 to engage with the external gear 24. In detail, the internal gears 26 includes a first internal gear 261 and a second internal gear 263. The first internal gear 261 is adjacent to the input shaft 10, and the second internal gear 263 is adjacent to connecting column 32 of the output shaft 30. The first internal gear 261 and the second internal gear 263 each engage with the external gear 24 at opposite sides of the input shaft 10. The input shaft 10 and the output shaft 30 are located on opposite sides of the gear assembly 20, and the housing 22 of the gear assembly 20 fixes the external gear 24. The output shaft 30 is received in the housing 22 through a bearing 301.

Figure 3:
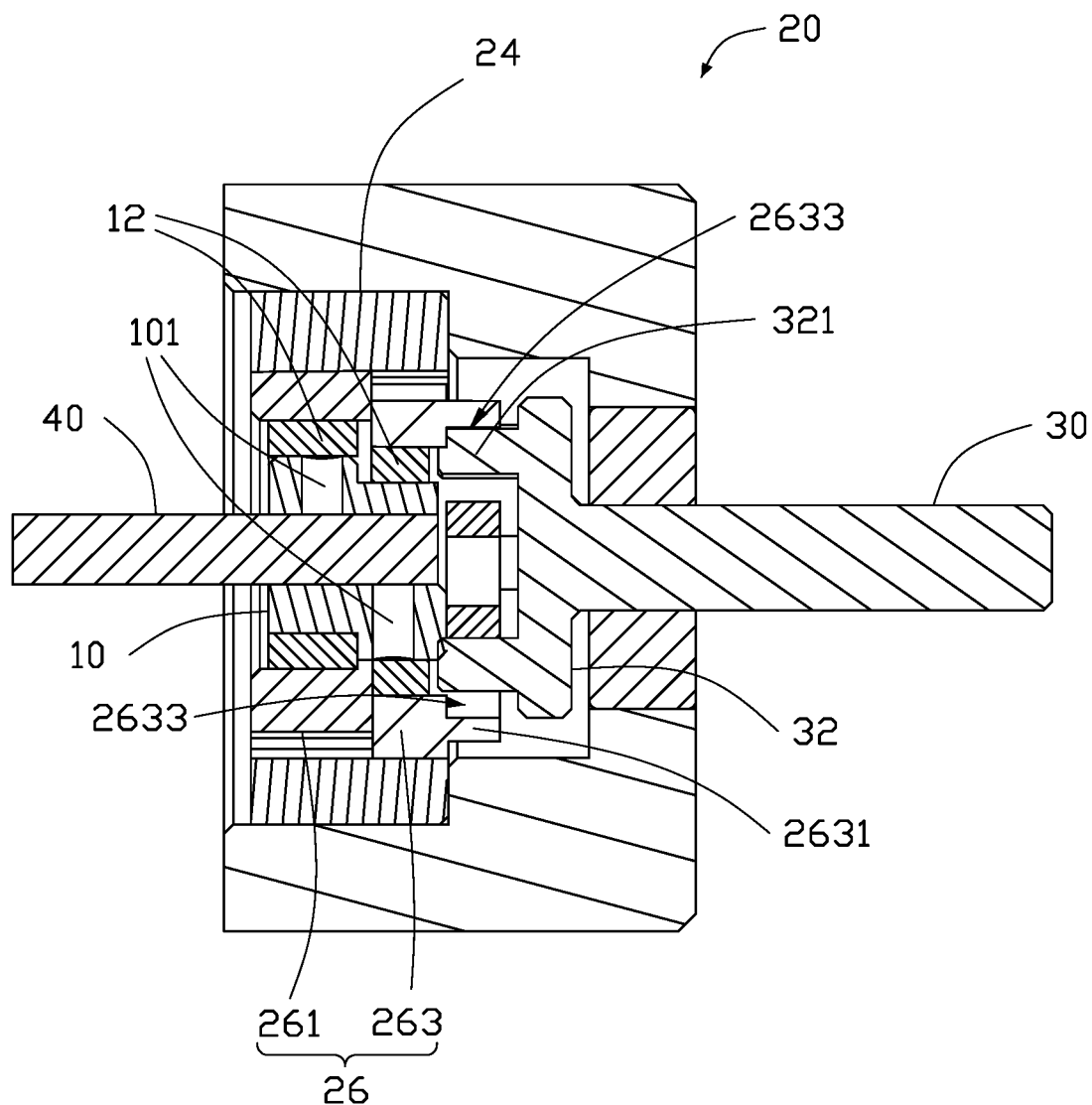
FIG. 3 is a cross-sectional view of the speed reducer of FIG. 1.

Referring to FIG. 3, the external gear 24 is an annular gear. The first internal gear 261 and the second internal gear 263 are located within the external gear 24. The first internal gear 261 and the second internal gear 263 engage with the external gear 24 on opposite sides of the external gear 24. Thus, when a driving shaft 40 of a motor (not shown) is rotatably coupled to the input shaft 10, the driving shaft 40 drives the input shaft 10 to rotate. The input shaft 10 drives the two offset pieces 101 to drive the first internal gear 261 and the second internal gear 263 to rotate. The first internal gear 261 and the second internal gear 263 rotate within the external gear 24. The external gear 24 is fixed to the housing 22 (as shown in FIG. 1) and cannot rotate. The first internal gear 261 and the second internal gear 263 rotating within the external gear 24 have a tooth difference with the external gear 24. The tooth differences of the first internal gear 261 and the second internal gear 263 with the external gear 24 may be the same or different. An output torque results from the tooth differences and is output through the output shaft 30 coupled to the second internal gear 263.

Figure 4:
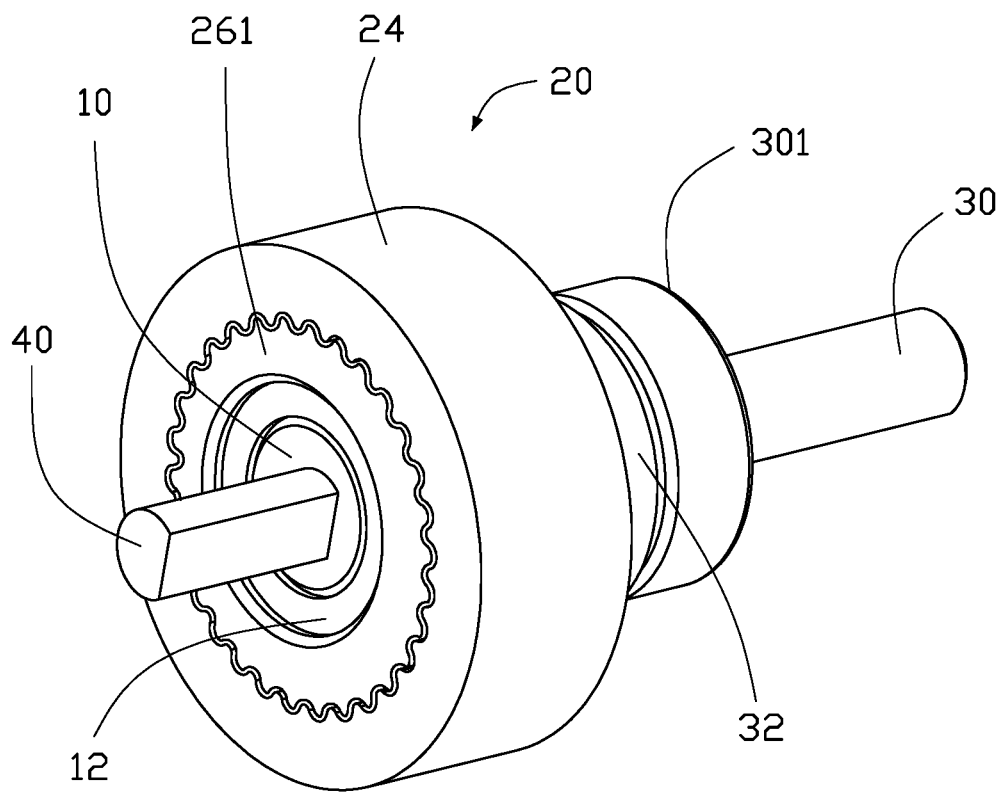
FIG. 4 is an isometric view of the speed reducer of FIG. 3.
Figure 5:
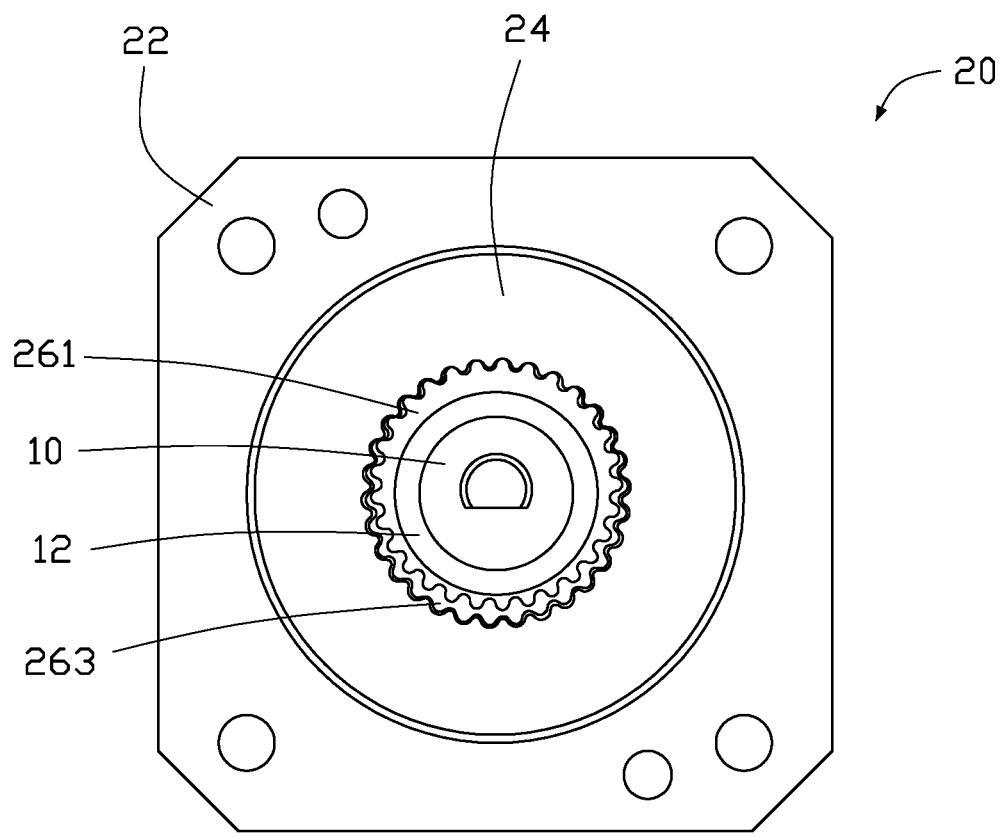
FIG. 5 is a front view of the speed reducer of FIG. 1.
Figure 6:
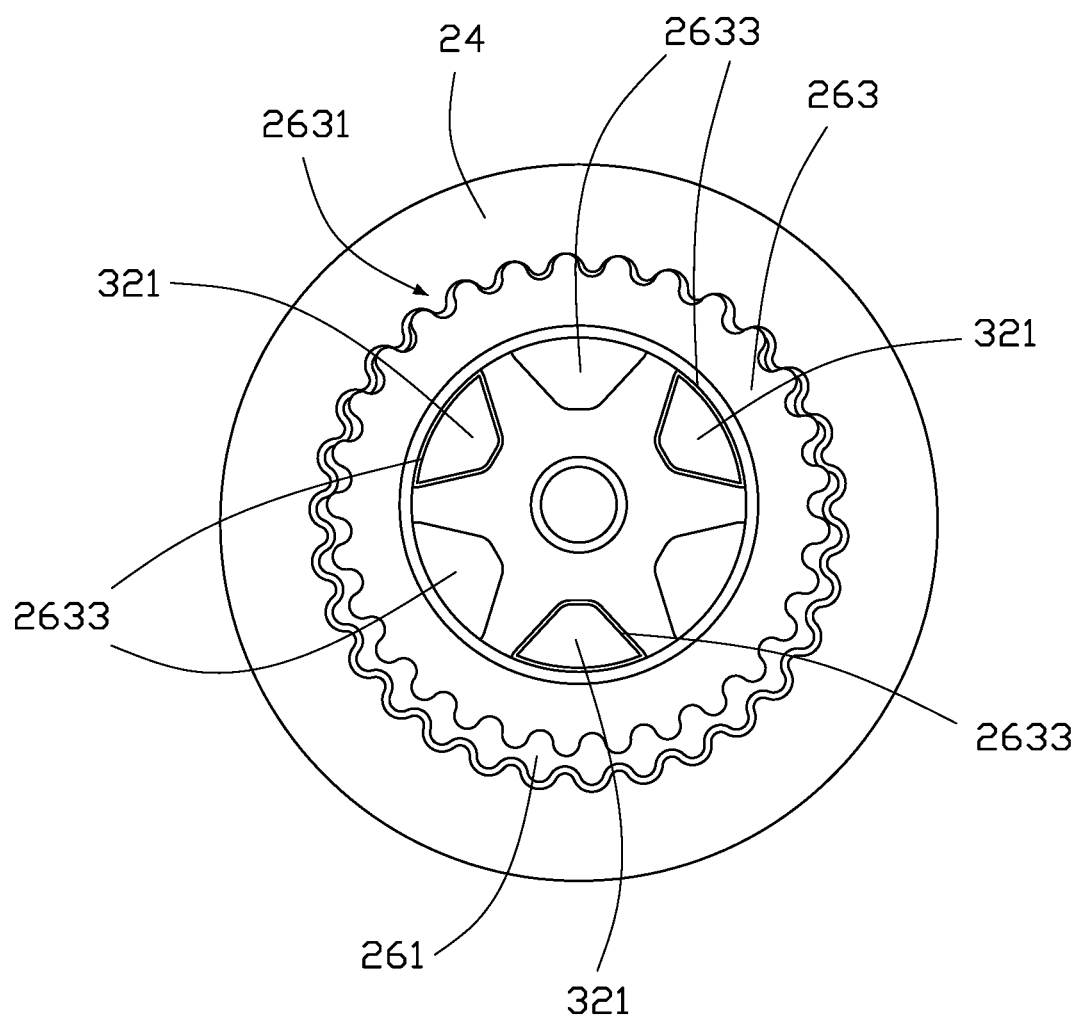
FIG. 6 is a cross-sectional view of an internal gear and a connecting column of the speed reducer of FIG. 1.

Referring to FIG. 4, the first internal gear 261 and the second internal gear 263 engage with the external gear 24 at points of contact and maintain engagement through a tooth profile. In at least one embodiment, the tooth profile of the first internal gear 261 and the second internal gear 263 engaged with the external gear 24 is a round tooth profile. The first internal gear 261 and the second internal gear 263 engage the external gear 24 at rounded contact points. In another embodiment, the first internal gear 261 and the second internal gear 263 may have a triangular tooth profile or a tooth profile of other shapes with the external gear 24. In detail, the first internal gear 261 and the second internal gear 263 are adjoined together and arranged 180 degrees apart from each other on the input shaft 10. Thus, the first internal gear 261 and the second internal gear 263 are configured to engage with the external gear 24 180 degrees apart from each other. As shown in FIG. 5, the first internal gear 261 and the second internal gear 263 each are spaced apart 180 degrees from each other to engage with the external gear 24. In addition, an axis of the input shaft 10 and an axis of the output shaft 30 are coaxial along a same horizontal line, and the first internal gear 261 and the second internal gear 263 are driven by the input shaft 10. The first internal gear 261 and the second internal gear 263 achieve gapless transmission with the external gear 24. The driving shaft 40 drives the input shaft 10 to rotate, which causes the first internal gear 261 and the second internal gear 263 to achieve gapless transmission with the external gear 24, and the output shaft 30 outputs zero-gap transmission of torque.

Referring to FIG. 4, a side of the second internal gear 263 adjacent to the output shaft 30 includes a connector 2631. The connector 2631 extends from the second internal gear 263 toward the connecting column 32. An interior of the connector 2631 defines a plurality of equally spaced apart scarf holes 2633. The scarf holes 2633 are elongated and arranged radially along the connector 2631. In detail, the connector 2631 is located on a side of the second internal gear 263 facing the output shaft 30. The interior of the connector 2631 defines the plurality of scarf holes 2633. The connecting column 32 is located on an end of the output shaft 30 and includes a plurality of protrusions 321. The protrusions 321 correspond to the scarf holes 2633. The protrusions 321 protrude from the end of the output shaft 30 and are inserted into the corresponding scarf holes 2633. Thus, rotation of the second internal gear 263 is transmitted through the protrusions 321 inserted into the scarf holes 2633 to the output shaft 30. Finally, the second internal gear 263 is rotated offset. The protrusions 321 inserted into the scarf holes 2633 maintains connection between the second internal gear 263 rotating and the output shaft 30 to precisely output torque transmission. In other words, the plurality of protrusions 321 inserted into the plurality of scarf holes 2633 throughout the offset rotation of the second internal gear 263 maintain zero-gap output torque between the second internal gear 263 and the output shaft 30.

The speed reducer 100 uses the offset configuration of the first internal gear 261 and the second internal gear 263 and the protrusions 321 inserted into the scarf holes 2633 to realize zero-gap transmission and high-precision and steady output torque.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A speed reducer comprising:
   an input shaft;
   an output shaft; and
   a gear assembly coupled to the input shaft and comprising a housing, an external gear, and at least two internal gears, the external gear located within the housing, the at least two internal gears connected inside the external gear and comprising a first internal gear and a second internal gear, one of the sides of the first internal gear rotatably coupled to the input shaft, one of the sides of the second internal gear coupled to a connecting column of the output shaft;
   wherein the second internal gear comprises a connector extending from the one of the sides of the second internal gear toward the connecting column of the output shaft, the connector is coupled to the connecting column;
   wherein the input shaft is an offset shaft;
   wherein the input shaft drives the at least two internal gears to maintain engagement with the external gear; and
   wherein the connecting column maintains transmission between the output shaft and the at least two internal gears.

2. The speed reducer of claim 1, wherein the input shaft comprises at least two offset pieces positioned offset to each other on the input shaft; each of the at least two offset pieces are rotatably coupled to a respective one of the at least two internal gears through a respective sleeve to cause the at least two internal gears rotatably coupled to the at least two offset pieces to engage with the external gear.

3. The speed reducer of claim 2, wherein the two internal gears rotatably coupled to the at least two offset pieces separately engage with the external gear on opposite sides of the input shaft.

4. The speed reducer of claim 1, wherein the first internal gear is adjacent to the input shaft; the second internal gear is adjacent to the connecting column of the output gear; the input shaft and the output shaft are located at opposite sides of the gear assembly; and the housing of the gear assembly is fixed to the external gear.

5. The speed reducer of claim 4, wherein the external gear is an annular gear; the first internal gear and the second internal gear are located within the external gear; the first internal gear and the second internal gear engage with the external gear at opposite sides of the input shaft within the external gear; the first internal gear and the second internal gear are engaged with the external gear with a tooth difference, the tooth difference is a difference in number of teeth of the first internal gear and the second internal gear; an output torque results from the tooth difference.

6. The speed reducer of claim 5, wherein the first internal gear and the second internal gear are engaged with the external gear at points of contact; engagement of the first internal gear and the second internal gear with the external gear is maintained by tooth profiles of the first internal gear and the second internal gear engaged with the external gear.

7. The speed reducer of claim 6, wherein the tooth profiles of the first internal gear and the second internal gear engaged with the external gear are round tooth profiles; the first internal gear and the second internal gear engage with the external gear at an interval of 180 degrees relative to each other.

8. The speed reducer of claim 4, wherein an interior of the connector defines a plurality of scarf holes; the plurality of scarf holes are formed by a plurality of spaced ribs of the second internal gear, the plurality of spaced ribs are elongated and arranged radially along the connector.

9. The speed reducer of claim 8, wherein the connecting column is located at one end of the output shaft and comprises a plurality of protrusions each corresponding to a corresponding one of the scarf holes; the protrusions protrude from the end of the output shaft toward the scarf holes.

10. The speed reducer of claim 9, wherein the protrusions of the connecting column are inserted into the corresponding scarf holes of the connector; rotation of the second internal gear is transferred through the protrusions inserted into the scarf holes to the output shaft.

* * * * *